United States Patent [19]
Van Zeeland

[11] 4,100,007
[45] Jul. 11, 1978

[54] METHOD OF MAKING PAINT ROLLER COVER

[75] Inventor: Gerald D. Van Zeeland, New Berlin, Wis.

[73] Assignee: E Z Paintr, Milwaukee, Wis.

[21] Appl. No.: 732,713

[22] Filed: Oct. 15, 1976

[51] Int. Cl.² .................... B32B 31/16; B32B 31/26
[52] U.S. Cl. ............................ 156/86; 15/230.11; 29/120; 69/21; 156/294
[58] Field of Search ............ 156/85, 86, 294, 84; 29/120, 132; 264/342 R; 15/230, 230.11, 230.15, 235; 428/85, 86; 69/21, 22

[56] References Cited

U.S. PATENT DOCUMENTS

| 2,272,935 | 2/1942 | Cotton | 69/21 |
| 2,621,507 | 12/1952 | Pharris et al. | 156/294 |
| 2,944,588 | 7/1960 | Sannipoli et al. | 69/21 |
| 3,275,490 | 9/1966 | Stoddart | 156/294 |
| 3,426,119 | 2/1969 | Chapman et al. | 156/86 |

FOREIGN PATENT DOCUMENTS

| 578,961 | 7/1959 | Canada | 264/342 R |

*Primary Examiner*—Caleb Weston
*Attorney, Agent, or Firm*—Mason, Kolehmainen, Rathburn & Wyss

[57] ABSTRACT

A method of fabricating a paint roller cover or similar applicator fabricated partially from animal pelt, such as sheepskin or other like shrinkable material, comprising the steps of forming a sleeve of the shrinkable material, providing an internal core about which the sleeve is embraced, and heat shrinking the sleeve onto the core. The sleeve can be overlapped about at least one end of the core and heat shrunk thereto for applying paint along adjoining corner surfaces.

6 Claims, 9 Drawing Figures

U.S. Patent  July 11, 1978  Sheet 2 of 2  4,100,007
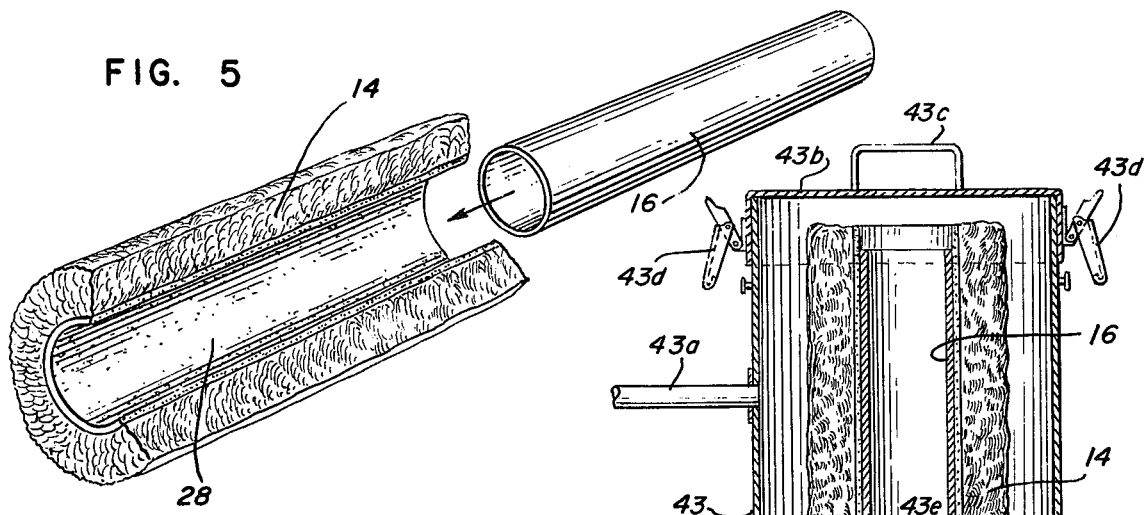
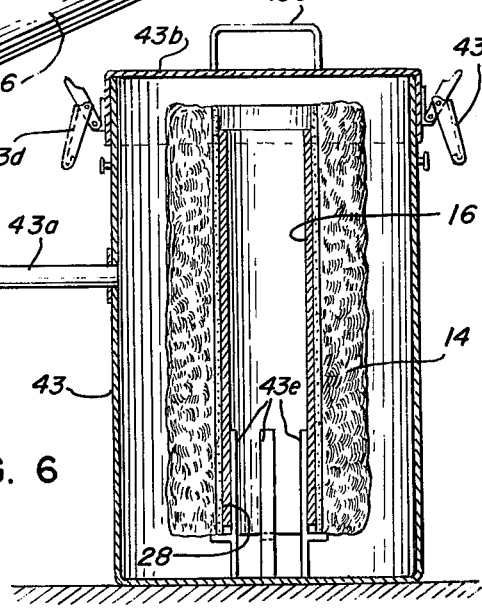
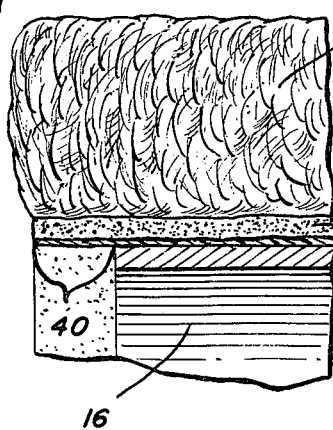
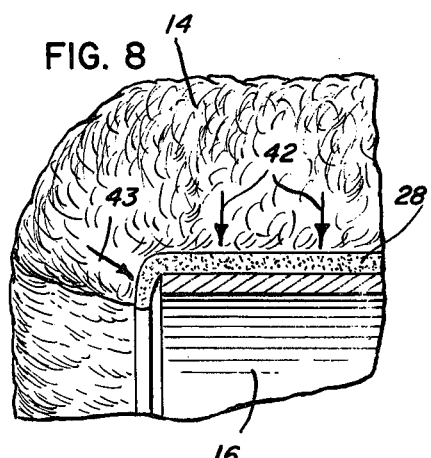
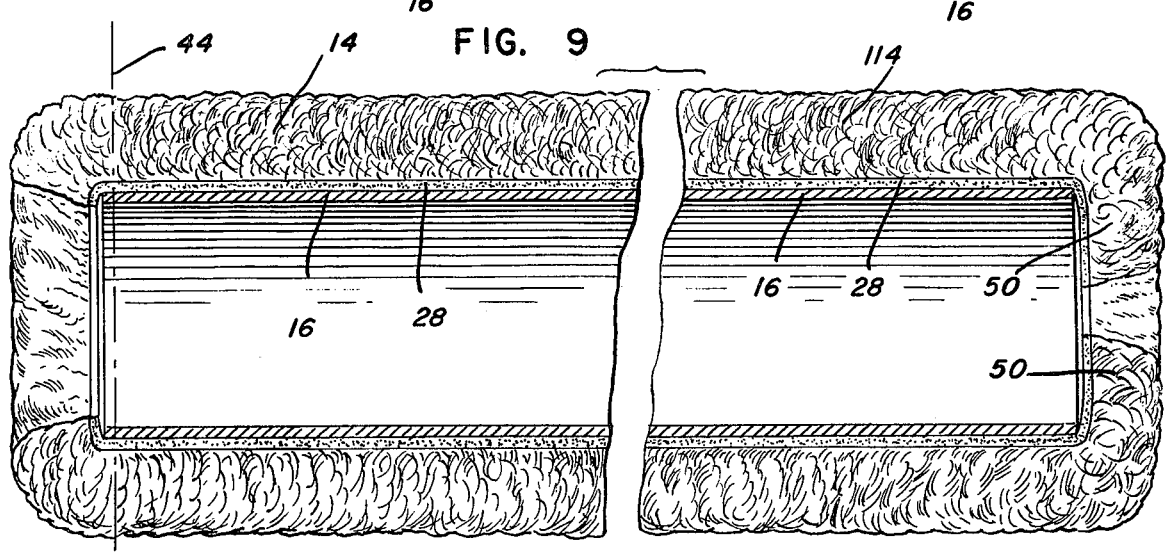

METHOD OF MAKING PAINT ROLLER COVER

BACKGROUND AND SUMMARY OF THE INVENTION

This invention relates to the manufacture of paint roller covers or other similar applicators from animal pelts or other like shrinkable material.

In the past, in manufacturing paint roller covers, the roller sleeve or cover had to practically approximate the outer diameter of the core about which the cover was to be placed. In this process, a machine would have a plurality of longitudinal very thin narrow blades which would embrace the core so as to force the core within the inside of the cover. Since the core was coated with an adhesive and then inserted into the sleeve, with the adhesive between the blades, serious problems arose in displacement and non-uniformity of the adhesive. The cover and core assembly then was subjected to an exterior pressure so as to adhere the cover to the core and the longitudinal blades then were withdrawn from between the cover and the core. Not only were there serious problems resulting from the non-uniformity of the adhesive between the cover and core, but air pockets between the cover and the surface of the core were created forming irregularities in the paint roller cover which would appear on the surface which was to be painted. These problems became serious because an animal pelt cover would be used in very fine painting projects. For simplicity purposes, throughout this disclosure, the cover for the core will always be referred to as sheepskin because it is a superior animal type pelt for use for such purposes.

The present invention has been designed so as to overcome these serious problems.

Therefore, a principal object of this invention is to provide a new and improved sheepskin paint roller cover.

In general, the method of the present invention involves the concept of shrinking, particularly heat shrinking, the sheepskin sleeve onto the internal core rather than clamping the sleeve onto the core as has heretofore been practiced in the past as described above. Sheepskin appears to be particularly responsive to shrinkage onto the internal core. In producing the roller cover of the present invention, the sleeve is formed with an inside diameter substantially larger than the outside diameter of the core. In addition, the shrinkage of the sleeve onto the core is accomplished by a steam heat. With the sleeve being substantially larger than the core, the longitudinal blades which grasp the core for insertion into the sleeve can be much thicker and a larger amount of adhesive can be placed therebetween to enhance a tighter bondage between the sleeve and the core. With the sleeve embraced about the core, the assembly then is subjected to steam heat for varying periods of time at varying pressures and temperature completely upon the quality and type of pelt in order to obtain the desired shrinking results. Several methods of treating the assembly with the steam heat have been attempted and each method seems to work to some extent. One process has been to subject the exterior of the assembly to a "steam stress" similar to steaming a pair of trousers in a laundry. A second process has been to insert a steam heat injector within the core of the assembly. A third process has been to insert the entire assembly into a steam chamber whereby the steam heat competely surrounds the assembly from the outside of the sleeve as well as the inside of the core. This latter process has proved very effective.

In steam shrinking the sheepskin pelt onto the core, it has to be necessary to prevent longitudinal shrinkage of the sheepskin pelt relative to the length of the interior core. Thus, the ends of the sheepskin cover are clamped to the ends of the core to prevent such longitudinal shrinking. One method simply has been to use such items as staples to penetrate both the sleeve and core to hold the sleeve longitudinally relative to the core. Another method which has proved very effective has been to make the sleeve slightly longer than the core so that as the sleeve shrinks, the overlapped portions also will shrink and actually physically grab the ends of the core to prevent the longitudinal shrinkage. In one form, the sleeve is made considerably longer than the core at least at one end thereof so that, after heat shrinking, the sleeve has an end radial portion overlapping the end of the core for painting adjoining corner surfaces.

Many advantages to this new and improved method are apparent from the above general description. For instance, the shrinking of the sleeve onto the core provides a much improved adhesion to make a much tighter fit onto the core. In addition, air bubbles which were present in rollers made by prior processes have been eliminated. Also, the shrinkage of the sheepskin pelt itself causes the hair of the pelt to come closer together to provide a much smoother and tighter matte for a much improved painting process.

In accordance with the exemplary embodiment of the present invention, a method of fabricating a paint roller cover or similar applicator from animal pelt, such as sheepskin or like shrinkable material, comprises the steps of cutting a predetermined size section from a portion of a sheepskin pelt and forming the section into a sleeve. The sleeve is formed by joining opposite edges, such as by stitches, with the skin side of the pelt facing outwardly so as not to interfere with the matte of the hair of the pelt. The sleeve then is inverted with the hair facing outwardly and the skin portion of the pelt forming the inside of the sleeve. A core is coated with an adhesive material and inserted into the sleeve which is of a substantially larger diameter than the core. The ends of the sleeve are clamped to the core either by staples or by overlapping the ends of the core and the assembly is subjected to steam heat by various methods, three of which have been described above. After a predetermined time, pressure and temperature, depending on the quality and type of animal pelt, the steam heat is cut off and a very tightly bonded uniform paint roller cover has been formed. The only remaining step is to trim the ends of the roller cover so as not to form loose hair which would accumulate paint and cause dripping. However, the overlapped portion of the sleeve at least at one end of the roller cover may be left in place for painting adjoining corner surfaces.

Lastly, it has been found that it is desirable to permit the roller cover which has already been subjected to the steam heat to remain in the chamber with the steam off for a very short period of time for curing purposes.

Other objects, features and advantages of the invention will be apparent from the following detailed description taken in connection with the accompanying drawings.

BRIEF DESCRIPTION OF THE DRAWINGS

FIG. 5 shows a perspective view of the roller cover partially cut away and the internal core about to be inserted therein;

FIG. 6 shows a perspective view of the cover embraced about the core and in central section, and about to be inserted within a steam heat chamber;

FIG. 7 shows a fragmentary sectional view on an enlarged scale of the sleeve embraced about the core and overlapping the end of the core;

FIG. 8 shows a view similar to that of FIG. 7 after the assembly has been steam heat shrunk with the overlapped ends of the sleeve shrunk about the end of the internal core; and FIG. 9 shows a central section through the paint roller cover with a dashed line (at the left) indicating where one end of the assembly will be trimmed, and the opposite end (at the right) having an overlapped sleeve portion.

DETAILED DESCRIPTION OF THE PREFERRED EMBODIMENT

Figure 1:
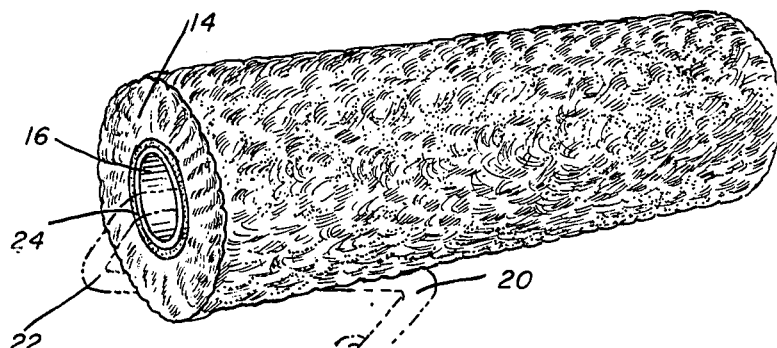
FIG. 1 is a perspective view of a paint roller cover fabricated in accordance with the method of the present application and mounted on an appropriate hand operated paint roller implement shown in phantom.

Referring to FIG. 1, there is shown a paint roller having an outer sheath 14 and an inner rigidifying core 16. The paint roller is a hand held implement having a handle 19 connected by wire or tubing to the inner core 16 of the paint roller cover. In this instance, a rod is secured to the handle 18 so as to dispose the handle generally centrally of the paint roller itself and is bent at a right angle, as at 20, with a portion extending somewhat beyond the end of the paint roller cover and has two more right angle bends as at 22 and 24 so that the rod extends into the inner core 16 of the paint roller cover and is secured thereto by various conventional means such as spring loaded wires (not shown). Paint is applied to the outer surface of the roller and is moved across the surface to be painted to apply paint thereto.

Figure 2:
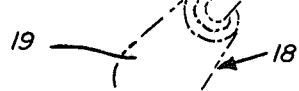
FIG. 2 is a somewhat schematic view of the method of the present invention, partially shown in block diagram form.
Figure 3:
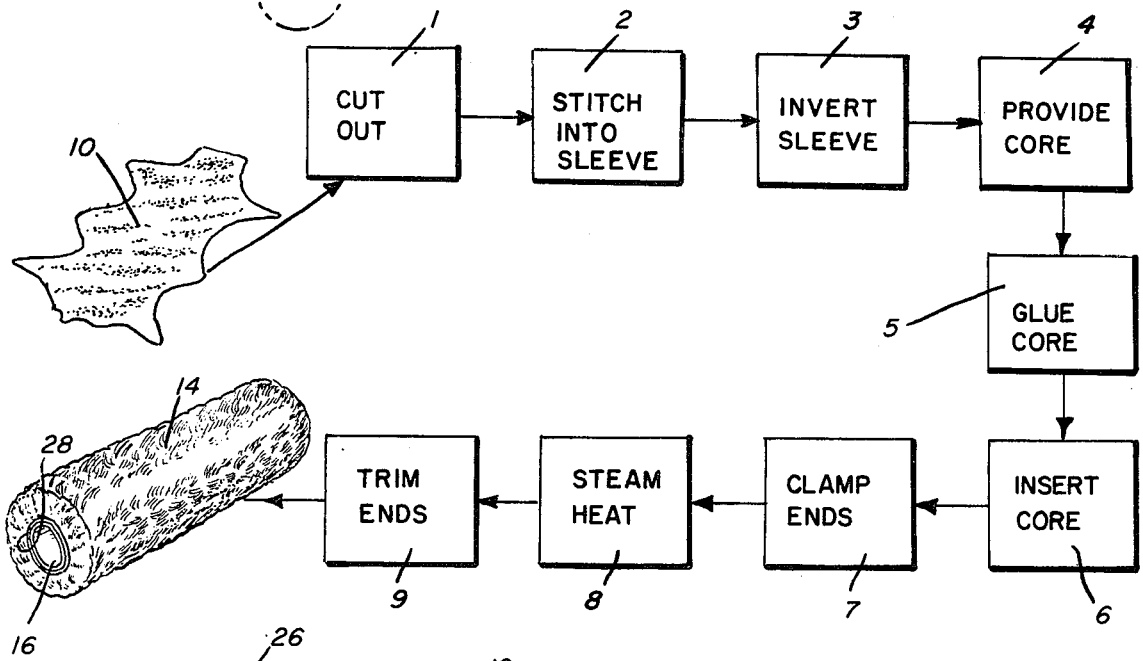
FIG. 3 is a perspective view of a section of an animal pelt showing by arrows how the pelt is folded to form a tube in fabricating the sleeve portion of the paint roller cover of the present invention.
Figure 3:
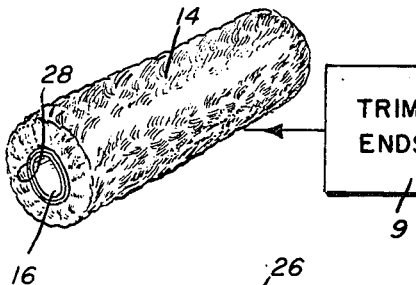
Figure 3:
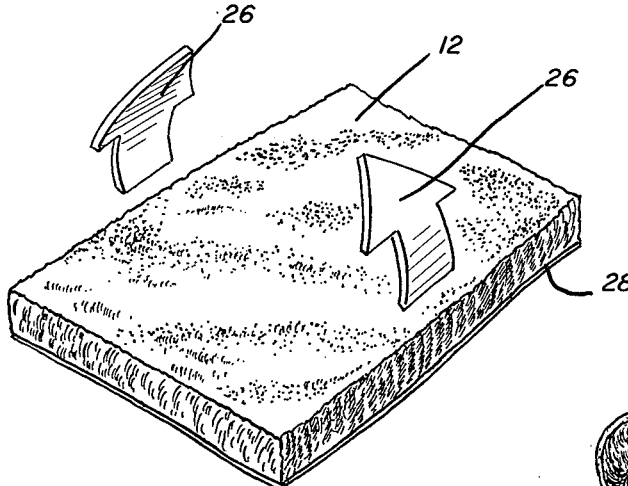

With the present invention, and referring first to FIG. 2, which is a somewhat schematic block diagram of the method of the present invention and the resulting product, an animal pelt 10, preferably sheepskin, is provided as the beginning product. The sheepskin utilized by applicant is very finely tanned and softened and the hair portion thereof is neatly groomed and trimmed to a substantially uniform length. The next step is to cut out one or more sections 12 (FIG. 3) from the pelt 10. Each section then is rolled in the direction of arrows 26 so that the skin side 28 of the sections face outwardly in the form of a tube as seen best in FIG. 4.

The next step as shown in block 2 in FIG. 2 is to join the adjacent longitudinal edges of the section 12 so as to maintain the section in a tubular form. One method of doing so is by a stitching process, as at 30 in FIG. 4. In some instances, the stitching will sandwich too much of the skin between the individual stitches so that the stitch line actually protrudes outwardly from the skin 28. This would be undesirable because it would create irregularities in the paint applied to the surface which is to be painted. In order to avoid this, a simple pounding machine is utilized to pound along the stitched line so as to level the stitch line even with that of the remainder of the skin 28.

Figure 4:
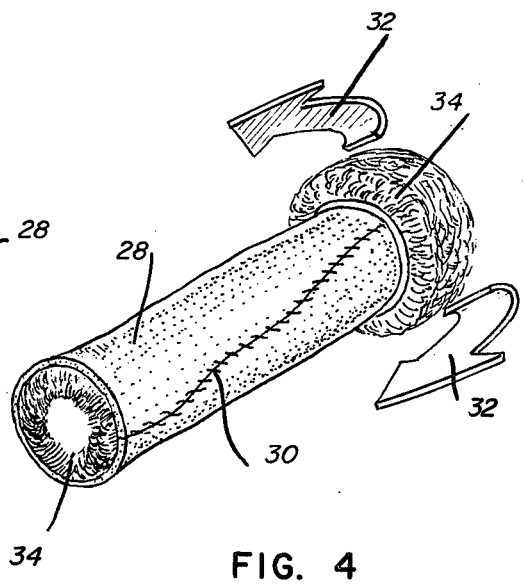
FIG. 4 shows the section of the animal pelt joined in a tube with the skin portion facing outwardly and one end of the tube beginning to be inverted in the direction of the arrows so that the hair portion of the animal pelt faces outwardly.

The next step is represented by block 3 in FIG. 2 and is shown partially in FIG. 4. That is, the tube which has been formed with the skin side facing outwardly for the stitching process, is inverted in the direction of arrows 32 so that the hair portion 34 faces outwardly, as the paint applying surface, with the skin 28 forming the interior diameter of the sheepskin sheath. This process can be done in any desired fashion whether manual or mechanical.

The next step, as shown by block 4 in FIG. 2, and as exemplified in FIG. 5, is to provide the inner rigid tube or core 16 about which the sheepskin sheath 14 is to be embraced.

The next two steps as shown by blocks 5 and 6 in FIG. 2 and as exemplified in FIG. 5, need some preliminary explanation. One common method of inserting the core 16 into the sheepskin sheath 14 is by utilizing a plurality of thin longitudinal blades (not shown) angularly spaced about the core and spring loaded so as to grasp the core for movement purposes. In the past, since the core and the interior diameter of the outer sheath were of substantially the same diameter, these blades had to be very thin and the adhesive which then was applied to the core ended up to be a very thin layer. Not only did this result in a thin layer but as the core was inserted within the sheath, the sheath actually longitudinally displaced portions of the adhesive causing buildup in certain areas which created further irregularities in the paint applied to the surface to be painted. As will be understood hereinafter, with the present invention, the inner diameter of the sheepskin sheath 14 can be substantially larger than the outer diameter of the inner core 16 and the longitudinal blades which grasp the core for insertion into the inside of the sheath could be of greater thickness and thus greater grasping capabilities. Thus, referring back to blocks 5 and 6 in FIG. 2, the inner core 16 is applied with a substantially thicker layer of adhesive which will not be interfered with or displaced by the inner diameter or skin portion of the sheepskin sheath as the core is inserted into the sheath.

Referring to block 7 in FIG. 2, a brief initial explanation is in order. As would be expected with any animal skin, when subjected to a heat shrinking process as described hereinafter, not only would the tubular sheath shrink radially onto the core, but the sheath itself also would have a tendency to shrink longitudinally along the core. To this end, the next step is to clamp the ends of the sheepskin sheath to the ends of the core to prevent such longitudinal shrinkage. One method of doing this would be to utilize means to penetrate both the sheath and core to hold the same against relative longitudinal movement. This could be done by utilizing a machine to insert penetrating means, such as staples, through both the sheath and the core to prevent the longitudinal shrinkage. However, this would require the utilization of a separate machine and an operator therefor. Referring to FIGS. 7 and 8, applicant has found a simple and very efficient method of preventing such longitudinal shrinkage and eliminating both the penetrating machine and the operator therefor. More particularly, as seen in FIG. 7, the outer sheath is dimensioned so as to overlap the ends of the inner core 16, as at 40. Thus, as the sheepskin sheath 14 is shrunk radially onto the inner core 16 in the direction of arrows 42 (FIG. 8), the overlapped ends also shrink about the ends of the inner core in the direction of arrow 43 (FIG. 8) and actually physically grab the ends of the core to prevent any longitudinal shrinking of the outer sheepskin relative to the core 16.

The next step in fabricating the paint roller cover of the present invention is to subject the combined sheath 14 and adhesive covered core 16 to a shrinking process so that the sheath adheres tightly and uniformly to the core. One method of doing this is by heat which naturally causes animal skins to shrink. However, applicant has found that a steam heat process is quite superior and results in a very superior product. Thus, block 8 in FIG. 2 shows the next step in the method of the present invention wherein the adhesively coated core 16 embraced by the sheepskin outer sheath is subject to a steam heat so as to shrink in all directions uniformly and tightly to the core to provide an extremely uniform outer surface of the hair portion of the sheepskin sheath 14. There are several methods of accomplishing this steam heating process. One of which is a sort of "seamstress" method which is commonly used in steaming trousers in a laundry. Another method would be to insert a steam injector into the core of the assembly until the curling process has been completed. However, applicant has found that the most efficient manner to steam heat the sheepskin paint roller cover described above is to insert the entire assembly into a steam heat chamber 43 (see FIG. 6) whereby the steam heat is applied uniformly entirely about the outside and inside of the assembly for varying times and varying pressures and temperatures in order to obtain the desired shrinking results. The steam heat chamber 43 has an inlet 43a for directing steam heat into the chamber. A lid 43b having a handle 43c and side clamps 43d is provided to cover the top of the chamber and to permit the placing of the assembly into the chamber. A plurality of spring fingers 43e can be provided at the bottom of the chamber for placing the assembly thereover, with the spring fingers bearing against the inside of the core 16 to hold the assembly generally centrally and vertically within the chamber. It also has been found that by leaving the core and sleeve assembly, after steam heat shrinking, in the steam heat chamber, without steam, for a short period of time, a sort of curing takes place and results in yet a better product.

The last step is shown in block 9 in FIG. 2 and to the left in FIG. 9 where at least one of the heat steamed paint roller covers is trimmed along dot-dash line 44 so as to provide a very smooth end for inserting the paint roller handle into the steamed paint roller cover and which will not accumulate paint or other material to be applied which would cause dripping during rotation of the roller. The final trimmed product is shown at the bottom lefthand corner of FIG. 2. In some instances, the paint roller cover is trimmed along dot-dash lines 44 at both ends of the cover to provide very smooth opposite ends therefor. However, as shown at the right of FIG. 9, the outer sheath 14 can be made considerably longer than the core (again, providing the aforesaid grasping effect during shrinking) and the resulting radial, overlapped portion, as at 50, retained in place. This radial overlapped portion of the sheath 14, at one end of the cover, thus could be used for applying paint into corners and adjoining corner surfaces to be painted while the opposite trimmed end (at the left in FIG. 9) would be positionable over the securing means of the paint roller handle.

Lastly, another advantage of this novel steam heat shrinking method is that because of the shrinking of the pelt the hairs thereof are brought into much tighter and compact relationship providing a much smoother and superior paint roller than has heretofore been provided.

The foregoing detailed description has been given for clearness of understanding only and no unnecessary limitations should be understood therefrom as some modifications will be obvious to those skilled in the art.

I claim:

1. A method of fabricating a paint roller cover or similar applicator fabricated partially from animal pelt, comprising the steps of:
    forming a tubular sleeve of predetermined diameter of said animal pelt;
    providing an internal core smaller than said predetermined diameter about which said sleeve is adapted to be embraced;
    applying adhesive to the exterior of said core to facilitate adherence between the sleeve and the core, said sleeve being sufficiently larger than the outside diameter of said core so as not to displace or render uneven the layer of adhesive on the outside of the core;
    mounting said core within said tubular sleeve and clamping the sleeve to the ends of the internal core to prevent longitudinal shrinking of the sleeve relative to the core; and
    heat shrinking said sleeve onto said core by placing said internal core with said sleeve embraced thereabout into a steam heating chamber to shrink the animal pelt to provide a roller having a denser pile and a substantially harder sleeve in adherence with the internal core.

2. A method of fabricating a paint roller cover or similar applicator from animal pelt, comprising the steps of:
    providing a portion of an animal pelt;
    cutting out a predetermined size section from said animal pelt;
    forming a sleeve from said section with the skin side portion of the animal pelt facing outwardly;
    joining opposite edges of said cutout section to form a sleeve of said pelt;
    inverting said sleeve so that the hair side thereof faces outwardly;
    providing an internal core about which said sleeve is adapted to be embraced;
    providing an adhesive material on the outside of said internal core, said core being of a sufficiently smaller external diameter than the internal diameter of said sleeve so that said sleeve can be placed over the core and not interfere with and displace the adhesive on the core;
    clamping the sleeve at its ends to said internal core;
    subjecting said clamped sleeve and internal core to heat shrinking by placing said internal core with said sleeve embraced thereabout in a steam heating chamber to shrink the skin portion of said pelt to provide a denser pile of hair and a substantially harder sleeve in adherence with said internal core; and
    trimming the ends of said heat shrunk sleeve and core so as to provide smooth ends to the paint roller cover.

3. The method of claim 2 wherein said animal pelt comprises sheepskin.

4. A method of fabricating a paint roller or similar applicator fabricated partially from animal pelt, comprising the steps of:

providing an internal core of predetermined diameter;

forming a tubular sleeve of animal pelt, larger than said predetermined sleeve diameter, said sleeve being of predetermined length so as to overlap the ends of said core;

providing an adhesive material on the outside of said internal core;

mounting the core within said tubular sleeve;

clamping the sleeve at its ends by means which penetrate both the sleeve and the core so as to prevent longitudinal shrinking of the sleeve relative to the core; and heat shrinking said tubular sleeve onto said core whereby the overlapping ends of said sleeve automatically grab the ends of said core to resist longitudinal shrinking of the sleeve.

5. The method of claim 4 wherein the ends of said joined sleeve and core are trimmed to remove said clamping means to provide smooth ends for said paint roller cover.

6. The method of claim 4 wherein said sleeve is sized to substantially overlap the core at one end whereby, after heat shrinking, a radial portion of said sleeve is provided for applying paint to corners and adjoining corner surfaces.

* * * * *